United States Patent Office 2,722,441
Patented Nov. 1, 1955

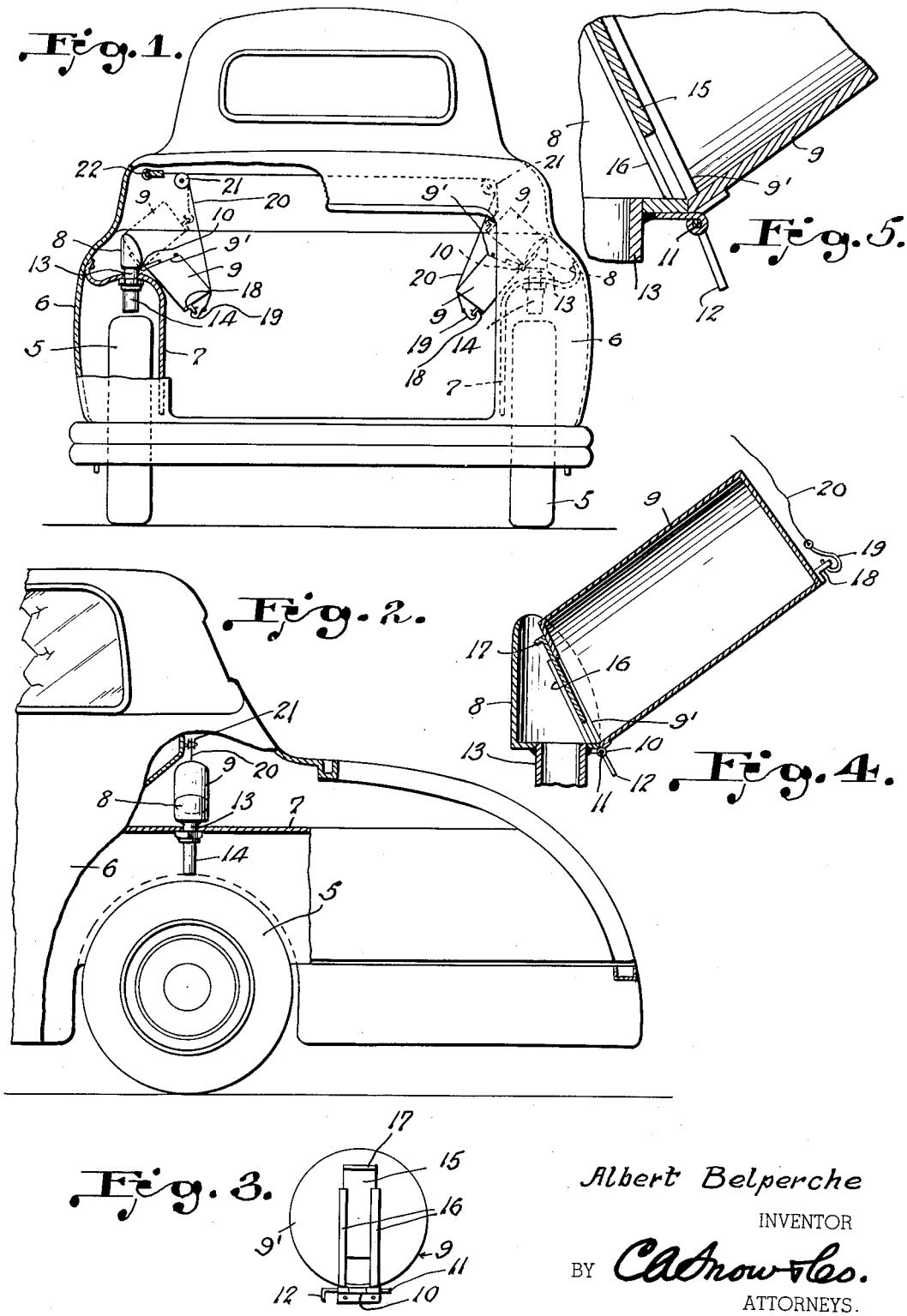

2,722,441
SAND DISTRIBUTING DEVICE FOR MOTOR VEHICLES

Albert Belperche, Glen Rock, N. J.

Application July 11, 1952, Serial No. 298,407

1 Claim. (Cl. 291—39)

This invention relates to a sanding device designed for use in depositing sand on the treads of the rear or power wheels of motor vehicles to increase traction on slippery roads, or to provide added traction to permit a vehicle equipped with the sanding device to move from a stalled position.

An important object of the invention is to provide means for directing the sand directly to the roughened tread of a vehicle tire to be carried to the ground surface at both the front and rear of the wheels to permit the vehicle to move forwardly or rearwardly.

A still further object of the invention is to provide a device of this character wherein the container or cylinder in which the sand is held, is normally disposed in a substantially upright position to prevent material from passing therefrom, means being provided for tilting the tank or cylinder to a discharging position, at the will of the operator.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a rear elevational view of a motor vehicle with parts of the trunk being broken away to illustrate the construction and installation of the sanding device.

Fig. 2 is a side elevational view of the rear end of a motor vehicle, with a portion of the body of the car broken away to illustrate the position of the sanding device.

Fig. 3 is an elevational view illustrating the discharge end of the tank or cylinder.

Fig. 4 is an enlarged sectional view through the tank or cylinder.

Fig. 5 is an enlarged elevational view illustrating the construction of the funnel into which the tank or cylinder discharges.

Referring to the drawing in detail, the reference character 5 indicates the rear wheels of a motor vehicle, which are provided with the usual pneumatic tires that have roughened treads.

The reference character 6 indicates one of the rear fenders of the vehicle, of which the plate 7 forms a part.

The attachment forming the essence of the present invention comprises the funnel-like member 8 which has an open side in which the tank or cylinder 9 is pivotally mounted as by means of the hinge 10 of which the hinge pin 11 forms a part, the hinge pin 11 having a right angled end 12 providing a handle for effecting removal or positioning of the pin, when it is desired to refill the tank or cylinder 9.

Extending from the funnel-like member 8, is the nipple 13 which is secured within an opening formed in the plate 7 of the motor vehicle fender structure, as clearly shown by Fig. 1 of the drawing. Secured to the nipple 13, is the rubber tube 14 which has its discharge end disposed in proximity to the tread of the tire, to direct sand or other granular material carried in the tank or cylinder, directly to the tire tread.

The end 9' of the tank or cylinder 9 is inclined and has an elongated discharge opening formed therein, the discharge of material through the opening being controlled by means of the slide 15 which moves in the guides 16 arranged on opposite sides of the elongated opening. This slide is provided with an end 17 which extends laterally and provides means for effecting movement of the slide to regulate the size of the elongated opening and consequently regulate the amount of sand or material discharged from the tank or cylinder 9.

At the rear end of the tank or cylinder, is the apertured ear 18 to which the hook 19 is attached, the hook 19 being carried at one end of the cable 20 that moves over the pulley 21 associated therewith, from where the cable passes through guides 22 terminating at a point adjacent to the steering column of the vehicle.

While I have shown and described the construction and operation of a single tank or cylinder for containing sand to be distributed to the wheels of a vehicle, it will of course be understood that these tanks or cylinders will be arranged in pairs over the rear wheels of vehicles so that they will deposit sand or granular material simultaneously.

In the operation of the device, assuming that the tanks or cylinders are in the position as shown in full lines in Fig. 1 of the drawing, wherein the tanks or cylinders are hung downwardly, it is obvious that by pulling the cable 20, the tanks or cylinders will be elevated to the positions shown in dotted lines in Fig. 1 of the drawing, wherein the sand or granular material will discharge through the discharge openings of the tanks or cylinders, directly onto the treads of the rear vehicle tires, from where the sand or granular material will be carried to the road surface directly in front and at the rear of the tires, so that the vehicle will be movable under its own power due to the traction afforded by depositing the sand or granular material at the point of contact between the wheels and road surface.

When the cable is released by the operator, it is obvious that the tanks or cylinders will move by gravity to the positions shown in full lines in Fig. 1 of the drawing.

Should it be desired to refill the tanks or cylinders, it is only necessary to disengage the cable from the tanks or cylinders by removing the hooks from the apertured ears 18 and withdrawing the hinge pin. The tanks may now be removed and filled after which they may be readily replaced by positioning the sections of the hinges together and placing the hinge pins within the hinges.

Having thus described the invention, what is claimed is:

A sanding device for motor vehicles, comprising a curved funnel-like member having an open side, a nipple extending from said funnel-like member supported within an opening of a motor vehicle fender, directly over the vertical axis of a rear wheel thereof, an elongated tiltable tank having a discharge opening, pivotally mounted within the funnel-like member and extended through the open side of said funnel-like member with its discharge opening lying within said funnel-like member in close proximity with said nipple, adapted to discharge material directly into the funnel-like member for deposit on a tire of said vehicle, in a line with a vertical axis of said tire, a manually controlled valve controlling the size of said discharge opening, and a manually controlled means for moving the tiltable tank to its discharging position within said curved funnel-like member.

References Cited in the file of this patent

UNITED STATES PATENTS

| | | |
|---|---|---|
| 512,480 | McPherson | Jan. 9, 1894 |
| 542,832 | McPherson | July 16, 1895 |
| 759,377 | Jenkins | May 10, 1904 |
| 1,473,852 | Harrell | Nov. 13, 1923 |
| 1,625,746 | Rosenthal | Apr. 19, 1927 |